US010201203B2

(12) United States Patent
Karavaev

(10) Patent No.: US 10,201,203 B2
(45) Date of Patent: Feb. 12, 2019

(54) METHOD FOR VIRTUALLY SELECTING CLOTHING

(71) Applicant: Konstantin Aleksandrovich Karavaev, Kirov (RU)

(72) Inventor: Konstantin Aleksandrovich Karavaev, Kirov (RU)

(73) Assignee: Konstantin Aleksandrovich Karavaev, Kirov (RU)

( * ) Notice: Subject to any disclaimer, the term of this patent is extended or adjusted under 35 U.S.C. 154(b) by 75 days.

(21) Appl. No.: 15/323,366

(22) PCT Filed: Jun. 9, 2015

(86) PCT No.: PCT/RU2015/000359
§ 371 (c)(1),
(2) Date: Dec. 30, 2016

(87) PCT Pub. No.: WO2016/003317
PCT Pub. Date: Jan. 7, 2016

(65) Prior Publication Data
US 2017/0156430 A1 Jun. 8, 2017

(30) Foreign Application Priority Data

Jul. 2, 2014 (RU) .................................. 2014126822

(51) Int. Cl.
*G06T 15/00* (2011.01)
*A41H 1/02* (2006.01)
(Continued)

(52) U.S. Cl.
CPC ............ *A41H 1/02* (2013.01); *G06Q 30/0643* (2013.01); *G06Q 50/10* (2013.01); *G06T 19/006* (2013.01)

(58) Field of Classification Search
None
See application file for complete search history.

(56) References Cited

U.S. PATENT DOCUMENTS 5,163,006 A 11/1992 Deziel
5,530,652 A 6/1996 Croyle et al.
(Continued)

FOREIGN PATENT DOCUMENTS

WO WO 0153910 A2 7/2001

OTHER PUBLICATIONS

Bye et al., Analysis of Body Measurement Systems for Apparel, 2006, Clothing & Textiles Research Journal, vol. 24 No. 2 pp. 66-79.*

(Continued)

*Primary Examiner* — Anh-Tuan V Nguyen
(74) *Attorney, Agent, or Firm* — Mark Malek; Stephen Bullock; Widerman Malek, PL

(57) ABSTRACT

The claimed method for virtually selecting clothing is carried out on the basis of at least two photographs of the body of a subject dressed in an elastic template having reference markings. A computer may processes the markings, produce a three-dimensional mathematical model of the body of the subject, which is input into a database using an identification number pertaining to same. The database is accessible by a buyer, a seller and a clothing manufacturer. Standard-shape graphical elements are applied, in a regular pattern, to an elastic covering which is worn on the body, and the relationship between the elements is used as a basis for forming a three-dimensional model of the body.

11 Claims, 9 Drawing Sheets

(51) Int. Cl.
*G06Q 50/10* (2012.01)
*G06Q 30/06* (2012.01)
*G06T 19/00* (2011.01)

(56) References Cited

U.S. PATENT DOCUMENTS

| | | | |
|---|---|---|---|
| 5,805,718 A | 9/1998 | Inoshiri et al. | |
| 8,605,148 B2* | 12/2013 | Robertson | H04N 5/275 348/135 |
| 2002/0166254 A1* | 11/2002 | Liebermann | A41H 1/02 33/759 |
| 2003/0004990 A1* | 1/2003 | Draper | H04L 29/06027 715/234 |
| 2005/0234782 A1* | 10/2005 | Schackne | G06Q 30/0601 705/26.1 |
| 2006/0202986 A1* | 9/2006 | Okada | G06F 17/5009 345/419 |
| 2006/0218484 A1* | 9/2006 | Saito | G06F 17/241 715/236 |
| 2010/0164862 A1* | 7/2010 | Sullivan | G06K 9/3216 345/156 |
| 2012/0095589 A1 | 4/2012 | Vapnik | |
| 2012/0127199 A1* | 5/2012 | Aarabi | G09G 5/024 345/629 |
| 2012/0299912 A1* | 11/2012 | Kapur | G06F 3/017 345/419 |
| 2012/0306919 A1* | 12/2012 | Suzuki | G06Q 30/0643 345/633 |
| 2013/0315475 A1* | 11/2013 | Song | G06K 9/00369 382/154 |
| 2014/0104656 A1* | 4/2014 | Crisp | G06Q 30/0276 358/1.18 |
| 2014/0168217 A1* | 6/2014 | Kim | G06T 13/40 345/420 |
| 2014/0176565 A1* | 6/2014 | Adeyoola | G06T 19/006 345/473 |
| 2014/0225888 A1* | 8/2014 | Bell | G06T 17/00 345/419 |
| 2014/0249961 A1* | 9/2014 | Zagel | G06K 9/00369 705/26.61 |
| 2015/0154453 A1* | 6/2015 | Wilf | G06K 9/00711 382/103 |
| 2016/0267576 A1* | 9/2016 | Crossman Sullivan | G06Q 30/0601 |

OTHER PUBLICATIONS

SIPO, "Chinese Patent Application for Chinese Application Serial No. 101647609 B, titled Human Body Modeling Method Suitable for Network Fitting System", published Feb. 17, 2010, Chinese Translation.
SIPO, "Chinese Patent Application for Chinese Application Serial No. 101647609 B, titled Human Body Modeling Method Suitable for Network Fitting System", published Feb. 17, 2010, English Translation.
SIPO, "Chinese Patent Application for Chinese Application Serial No. 103106586 A, titled Three-Dimensional Virtual Fitting System", Published May 15, 2013, Chinese Translation.
SIPO, "Chinese Patent Application for Chinese Application Serial No. 103106586 A, titled Three-Dimensional Virtual Fitting System", Published May 15, 2013, English Translation.
EPO, "European Search Report for related application EP 15814443.6", dated Dec. 15, 2017.
Karavaev Konstantin Aleksandrovich, Abstract of WO2016003317 A1 titled "Method for Virtually Selecting Clothing", Published Jan. 10, 2014 (Russia).

* cited by examiner

View 1　　　View 3　　　View 2

| Measurement | Value | | | |
|---|---|---|---|---|
| Height | 146-170 | | | |
| Chest circumference | 84-96 | 96-110 | 110-120 | 120-132 |
| Waist circumference | 62-72 | 72-84 | 84-98 | 98-114 |
| Hip circumference | 88-100 | 100-114 | 114-128 | 128-144 |
| Size type No. | 1 | 2 | 3 | 4 |

METHOD FOR VIRTUALLY SELECTING CLOTHING

CROSS REFERENCE TO RELATED APPLICATIONS

This is a national stage application under 35 U.S.C. § 371 of PCT patent application PCT/RU/2015/000359, filed on Jun. 9, 2015, which claims the benefit of RU2014126822, filed on Jul. 2, 2014, each of which is hereby incorporated by reference in its entirety.

FIELD OF THE INVENTION

The claimed technical solution relates to clothing industry and associated trade industry, in particular to a method for virtually selecting clothing by creating a virtual three-dimensional body template, and by selecting virtually ready-made or made-to-measure clothing and accessories.

Over the centuries, worldwide fashion and clothing manufacturers have used the experience of producing clothing items based on measurements of a subject's body. Many years of statistical studies and experience in manufacturing and trading yielded standards allowing to structure and systematize human race (and presently, the entire pet population as well) based on height, girth, gender, age and other parameters. Therefore, measurement data of a subject's body are primary parameters for manufacturing and fitting of clothing.

The primary object of the present invention is to bridge the gap between clothing sellers, manufacturers and ultimate consumers, thus satisfying common interests and requirements by using novel technology of virtual clothing selection. The novel technology seems be easy to implement and consistent with conventional widely used technologies. Further, the novel technology is likely to greatly enhance current technologies which have already been proved to be effective.

Presently, virtual selection is implemented using various methods. Some of said methods are described in the following prior art documents.

DESCRIPTION OF THE PRIOR ART

CA2518017 C discloses scanning a body using a graphically segmented elastic covering and a video camera placed at a fixed distance and passing along a fixed orbit around the static body. CA2518017 C, PCT/EP2004/002136, published on Jan. 3, 2012, priority date Mar. 5, 2003, claimed on Mar. 3, 2004 by Dirk Rutschmann; assigned to Corpus. EAg, Dirk Rutschmann.

This prior art technical solution has the following disadvantages: the body has to be kept static during scanning; the virtual model of the body obtained by scanning is static; using complex specialized hardware; using not standardized auxiliary devices; only one body can be scanned at a time.

U.S. Pat. No. 5,805,718 A1 discloses modeling a three-dimensional body shape using a computational method after capturing an image from a predetermined distance by means of a specialized infrared-sensitive camera (see Patent Publication U.S. Pat. No. 5,805,718 A, PCT U.S. patent application Ser. No. 08/539,761, published on Sep. 8, 1998, priority date Oct. 7, 1994, claimed on Oct. 6, 1995 by Ziquan Hong, Ryo Inoshiri, Akira Yoshida; initially assigned to Sharp Kabushiki Kaisha).

This prior art technical solution has the following disadvantages: computational complexity; high error margins in measurement results associated with the computational method; using expensive specialized measuring hardware; specific studio conditions are required to carry out the imaging procedure.

WO2012129252 discloses three-dimensional modeling of a body shape by means of combining and projecting the shape based on two-dimensional projections obtained by capturing photographic images of a subject (see Patent Publication WO2012129252 A1, PCT/US2012/029856, filed on Sep. 27, 2012, priority date Mar. 24, 2011, by Paul James Kane, Sen WANG; assigned to Eastman Kodak Company). WO2008113367 (A2)

This prior art technical solution has the following disadvantages: large amounts of data subsequently requiring compression; limited result generation speed due to computational complexity; necessary software requires excessive computer processing power and large data transmission bandwidth; specialized video camera is required for imaging; specific studio conditions are required to carry out the imaging procedure; simultaneous scanning is limited to two bodies, WO2008113367 (A2)

5) RU2504009 "METHOD FOR PROVIDING REMOTE FITTING AND/OR SELECTION OF CLOTHING" is considered to be the closest prior art for the claimed invention, RU2504009, IPC G06Q50/10 (2012.01), A41H1/02 (2006.01).

This prior art invention discloses a method of facilitating remote fitting and/or selection of clothes, the method including:

(a) setting up and maintaining at least one web-site based on at least one web-server;

(b) creating, based on computer data storage media connected to the said web-server through the Internet, at least one database of three-dimensional models of clothing items, the creating comprising the steps of:

forming a library of three-dimensional templates of clothes changeable depending on size and/or type of material, forming a library of three-dimensional templates of human bodies for both genders and constitution types, with the use of a photo panel made of flexible material, provided with a graphic marking, and a photographic camera, obtaining at least two photographs of different sides of one clothing item, mainly its front side and back side, selecting on the photograph contours of a clothing item as well as type, shape and geometric dimensions of component parts of the clothing item, finding in a database of clothing items or building a similar three-dimensional model of a clothing item using said template of the clothing item and the photographs of the clothing item taken, providing the obtained three-dimensional model of the clothing item with the data necessary for its fitting and characterizing at least one of its type, size, color and brand name;

(c) facilitating interaction of a consumer with the web-server through the web-site for fitting and/or selection of clothes, the facilitating comprising the steps of:

receiving an input of data on a customer's body dimensions chosen from dimensions which include, at least: height, chest circumference, waist line circumference, hip circumference, hip height, leg length, arm length, underbust circumference, shoulder circumference, shoulder length, neck circumference, shoulder breadth, length of back till waist line, breast center, length of the front till waist line, breast height, back breadth, calf circumference, building a three-dimensional model of the body of the consumer with the use of a predetermined three-dimensional template of a human body, corresponding to the input data, receiving input of data on the clothing items required by the customer, determining availability of the said three-dimensional models of the clothing items corresponding to the obtained customer's body three-dimensional model, selecting at least one clothing item, corresponding to the obtained three-dimensional model of the customer's body if at least one required three-dimensional model of the clothing item is available.

With the advent of computer technology in the field of clothing manufacturing, the first techniques to be implemented were standard techniques of designing articles of clothing on a plane. One disadvantage of the prior art invention is that the shape of the built three-dimensional mannequin model differ from body shape of a real human, and therefore mere knowledge of linear dimensions of the human body does not provide for ideal fit of clothing on the human figure.

The method lists organizational arrangements required to provide cooperation between clothing manufacturers and retail networks; however, the method lacks measurement technology providing good fit of clothing for an individual three-dimensional figure. The method does not allow the consumer to see a realistic three-dimensional image of clothing on his/her body.

Technical Effect

The claimed solution provides a virtual three-dimensional mannequin having the unique proportions of an individual subject, with the selected article of clothing put thereon. The claimed invention is intended to solve the problem of selecting clothing from databases of various clothing manufacturers, said clothing fitting an individual subject not only by size, but also by corresponding body type. Furthermore, achieving the required effect requires using only two images of the subject, the images being front view and rear view, while the subject is covered by an elastic covering having reference markings, said covering used in calculating anthropometric data of the measured subject and forming a virtual three-dimensional template of the subject's body, wherein the computer processing of the photo or video images includes:

determining size type of the elastic template by the type of reference markings;

comparing dimensions of extensible portions on the photo image having reference dimensions of non-extensible graphical elements on the template;

determining linear dimensions of body parts being measured; said determination being provided by the fact that the template comprises an elastic base extensible within one individual size type with non-extensible graphical elements of a particular shape and size affixed to the outer surface of the base, said elements having dimensional stability and non-extensibility in all directions. Shape, number and positioning of non-extensible graphical elements are selected based on the template size type.

The seller functions as a link between the clothing manufacturer and the buyer by establishing (on the seller's website by means of computing hardware) available databases of human body sizes and catalogs of clothing in production. Furthermore, the seller provides clothing manufacturers with data pertaining to changing trends in anthropometric parameters, tastes and requirements of product consumers, and provides buyers with data pertaining to available clothing models more suitable for the buyer based on shape.

Wide using of the present method would allow for gathering statistical data pertaining to anthropometric parameters of the population for inputting into databases, and would allow for development of various clothing models based on said statistical data.

SUMMARY OF THE INVENTION

The method for virtually selecting clothing includes:

obtaining images (front view and rear view) of a subject to be provided with the selected clothing;

transferring the images to a computing device and computing dimensions of various body areas, and creating three-dimensional models of the subject's body based on said computations, wherein relevant software can be installed on one or two computing devices. When two computing devices are used, one device can be used for preparing photo or video material for subsequent processing, and the other device can be used for the remaining computations;

storing the three-dimensional model of the subject's body on the website of the clothing seller, with identification data assigned to said subject, in a library accessible by the subject, the seller and the clothing manufacturer, wherein said library data can be subsequently used by the subject by inputting an identification code without further measurement of the body parameters;

comparing the obtained parameters of the three-dimensional model of subject's body with parameters of clothing being offered by various manufacturers on websites accessible by the seller;

selecting articles of clothing meeting subject's requirements from a variety of available articles of clothing.

In order to implement the method, the following requirements sufficient for realizing the method must be met:

setting up and maintaining at least one website for virtual fitting of clothing based on at least one web server;

forming at least one database of clothing articles based on computer data storage media connected to the said web server through the Internet;

forming at least one database of three-dimensional templates of various human bodies based on computer data storage media connected to the said web server through the Internet;

wherein the subject being photographed is covered in an elastic covering having reference markings, said covering used in calculating the subject's anthropometric data and forming a virtual three-dimensional template of the subject's body, wherein computer processing of the photo or video images includes:

determining size type of the elastic template by the type of reference markings;

comparing dimensions of extensible portions on the photo image having reference dimensions of non-extensible graphical elements on the template;

determining linear dimensions of body parts being measured; said determination being provided by the fact that the template comprises an elastic base extensible within one individual size type with non-extensible graphical elements of a particular shape and size affixed to the outer surface of the base, said elements having dimensional stability and non-extensibility in all directions. Shape, number and positioning of non-extensible graphical elements are selected based on the template size type.

DETAILED DESCRIPTION OF THE DRAWINGS

Figure 1:
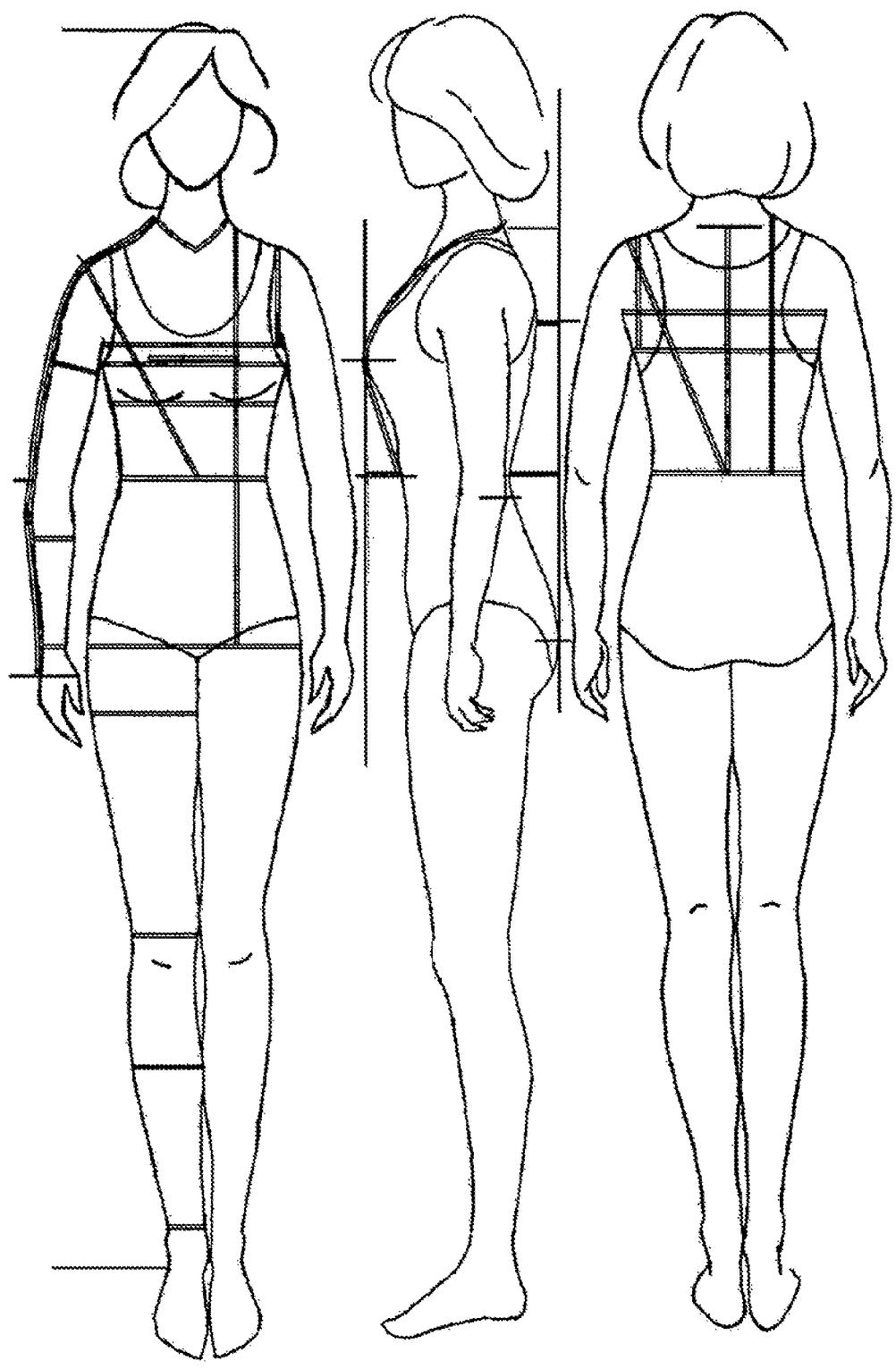
FIG. 1 shows a view of a human body and an example of standard measurements of a human body.

All traditional methods of designing clothing are essentially based on calculations based on anthropological body measurements taken according to standards applicable to the entire world population. An example of some of the primary human body measurements is shown in FIG. 1 illustrating a front view, a rear view and a side view of a human body. Said views are most important for determining individual body size features, in the order listed above. View 1 in FIG. 1 shows primary measurements for determining size features on the front side of the body. The number of measurements taken using this view is at least 20. Most of the measurements are taken using this view. For some types of clothing, measurements taken using this view are sufficient, allowing the consumer to receive the measurement result and use it after taking just one image, further adjusting and supplementing the obtained effect by means of further measurements.

View 2 in FIG. 1 (rear view) can provide at least seven (7) measurements, and View 3 in FIG. 1 (side view) can provide at least seven (7) measurements; most of said measurements are supplementary and are used only to adjust measurements taken using other views; said supplementary measurements assist in determining posture and balance of an article of clothing and parts thereof. Following the step of taking measurements shown in FIG. 1, any tailor, fitter or designer can manufacture clothing for the measured body, and a clothing seller can offer an in-stock clothing range of matching size.

The special importance of the two primary views (front view and rear view) in obtaining the most important measurements requires auxiliary methods for marking body surface using reference elements, the methods allowing to calculate volume parameters using only two-dimensional images.

One of such methods includes marking side surfaces of the body using non-extensible reference elements, parts of which should be visible on two views. Said elements have an elongated shape, extending along their length across side surfaces of the body. Such elements provide measurements of non-visible portions of body surface that are not caught by the photo/video camera lens, and allow for precise depth of field measurement. Usually, the measured body is measured in a vertical position, and images are captured through a lens positioned in front of the measured object.

Figure 2:
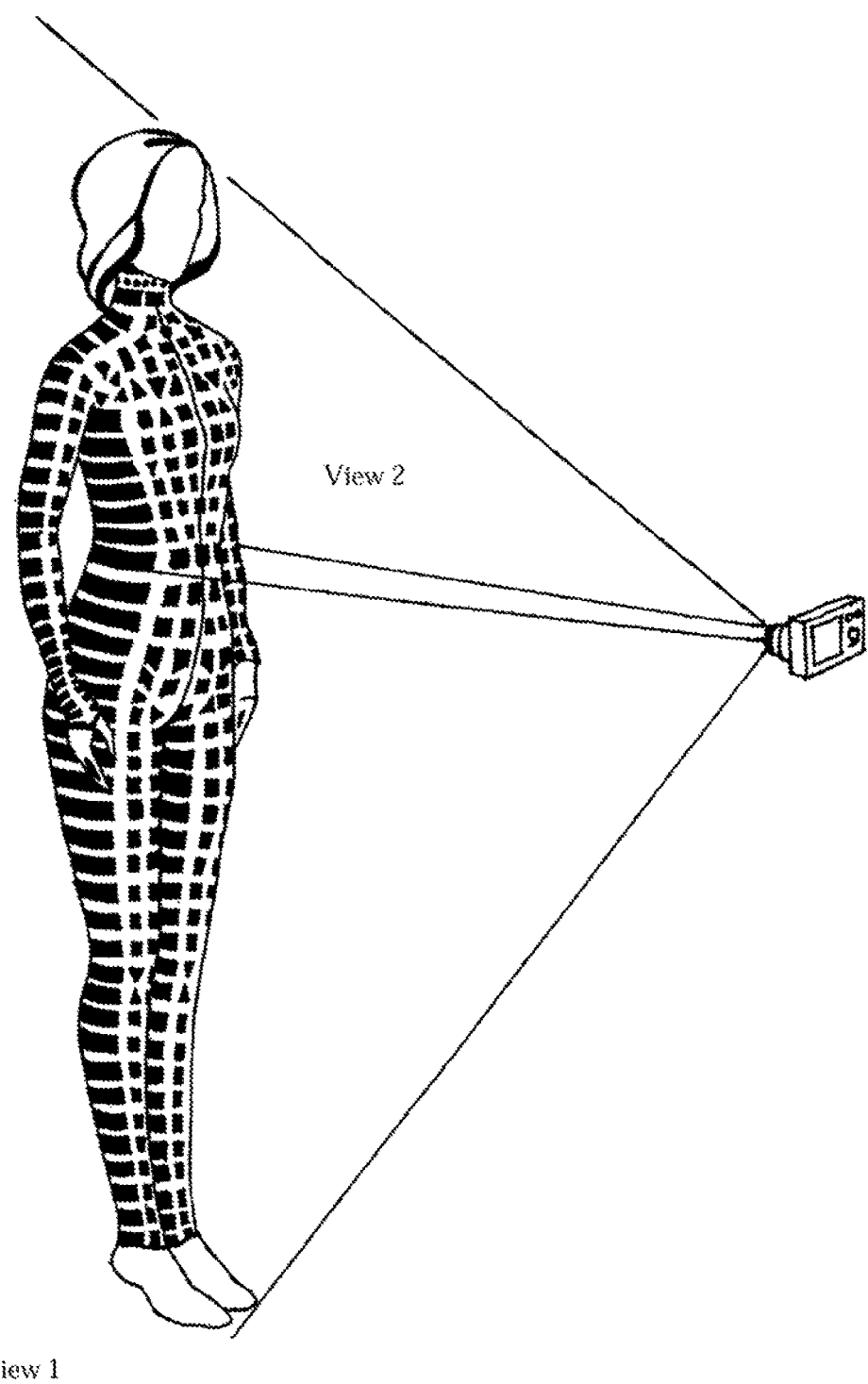
FIG. 2 shows an example of capturing a photographic image of a subject wearing an elastic template.

An example of conventional photo/video imaging is shown in FIG. 2. The example clearly shows that side surfaces of all parts of the body located in the "blind spot" of the camera are marked in FIG. 2, View 1 with elongated reference elements arranged mostly in horizontal planes. In contrast, parts of the body directly visible to the camera are marked with reference elements of different shapes and sizes, which allows for calculation of spatial positions thereof and forms a unique pattern of individual portions of the body, thus facilitating recognition of said portions. The figure shows that measurement as a process is not difficult for the user of the method due to the fact that it is carried out with the user assuming a regular natural posture; the process is no more difficult than a regular photo or video imaging. The user of the method is only required to wear a special device, to ensure that the body or required parts thereof are in the frame of the camera lens, and to carry out the imaging.

The result of the photo or video imaging can be owned solely by the user, if required. After obtaining a photographic image or a video footage, the user can freely use the photo/video materials. Obtained images do not constitute a measurement result, but only a primary material used for subsequent processing and calculations. Therefore, the material can be processed at a different time using various methods.

Figure 3:
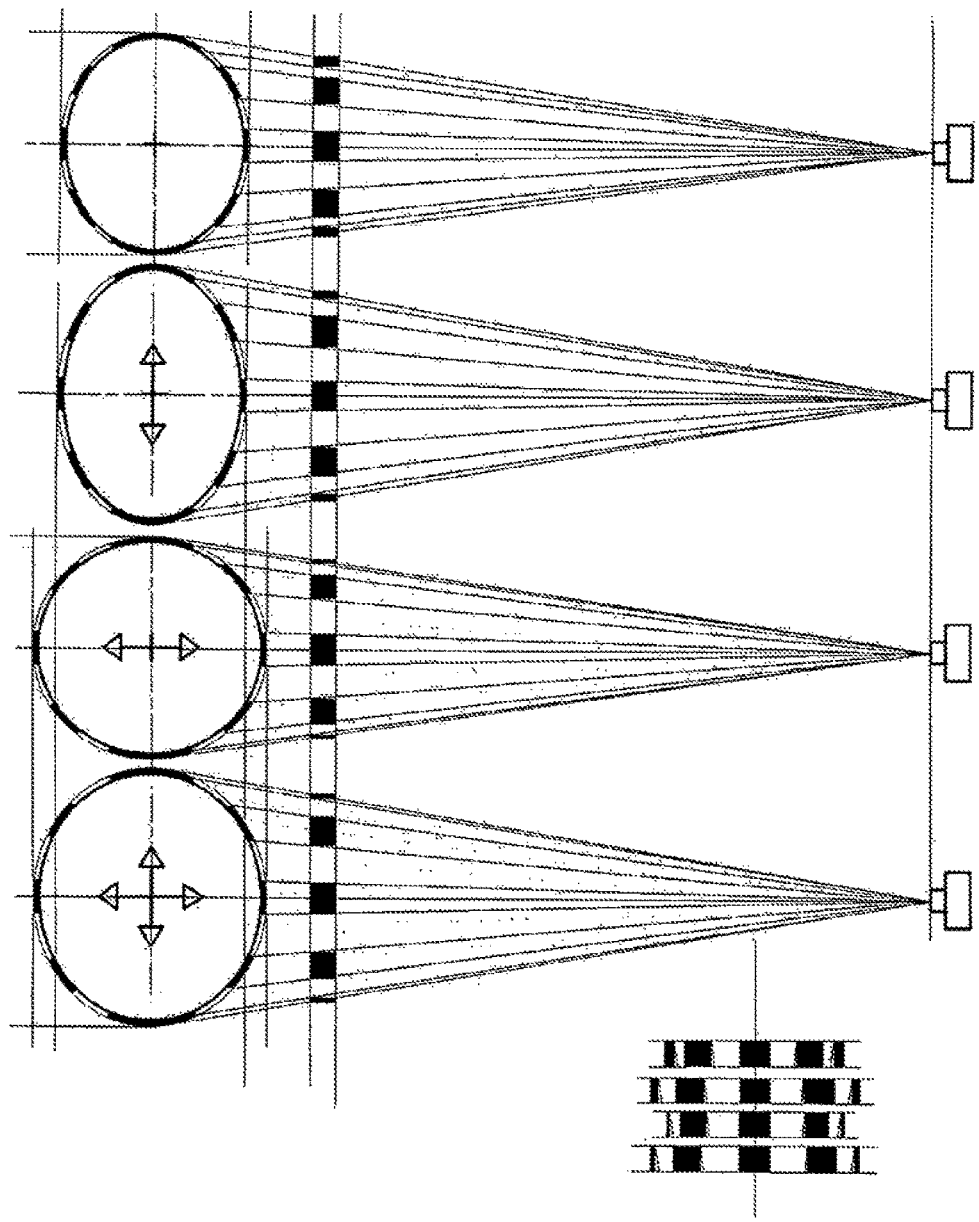
FIG. 3 shows a comparison of sections at waist level illustrating the principle of volume and shape recognition on a two-dimensional image. For the purposes of comparison, four sections at waist level and side views of each section are shown.

An example of the method for body measurement and calculations of geometrical parameters of body surface is shown in FIG. 3. The figure shows sections of the human body (FIG. 3, View 2) at waist level. Section position is shown in FIG. 2, View 2. The figure shows four different sizes of sections in FIG. 3, View 1, showing not only particular volume differences, but also shape differences. For example, sections 1 and 2 have identical linear size on X-axis, and sections 3 and 4 have identical size on Y-axis. Body surface at waist level is projected onto photo camera lens (FIG. 3, View 3). The comparison between visual section measurement results at waist level for four different sizes and shapes illustrates the principle and possibility of extracting required measurement data. The visual results of each measurement example are unique, as shown in FIG. 3, View 4. The visual result shown in a photographic image is unique for each human figure, as each human body is unique.

Figure 4:
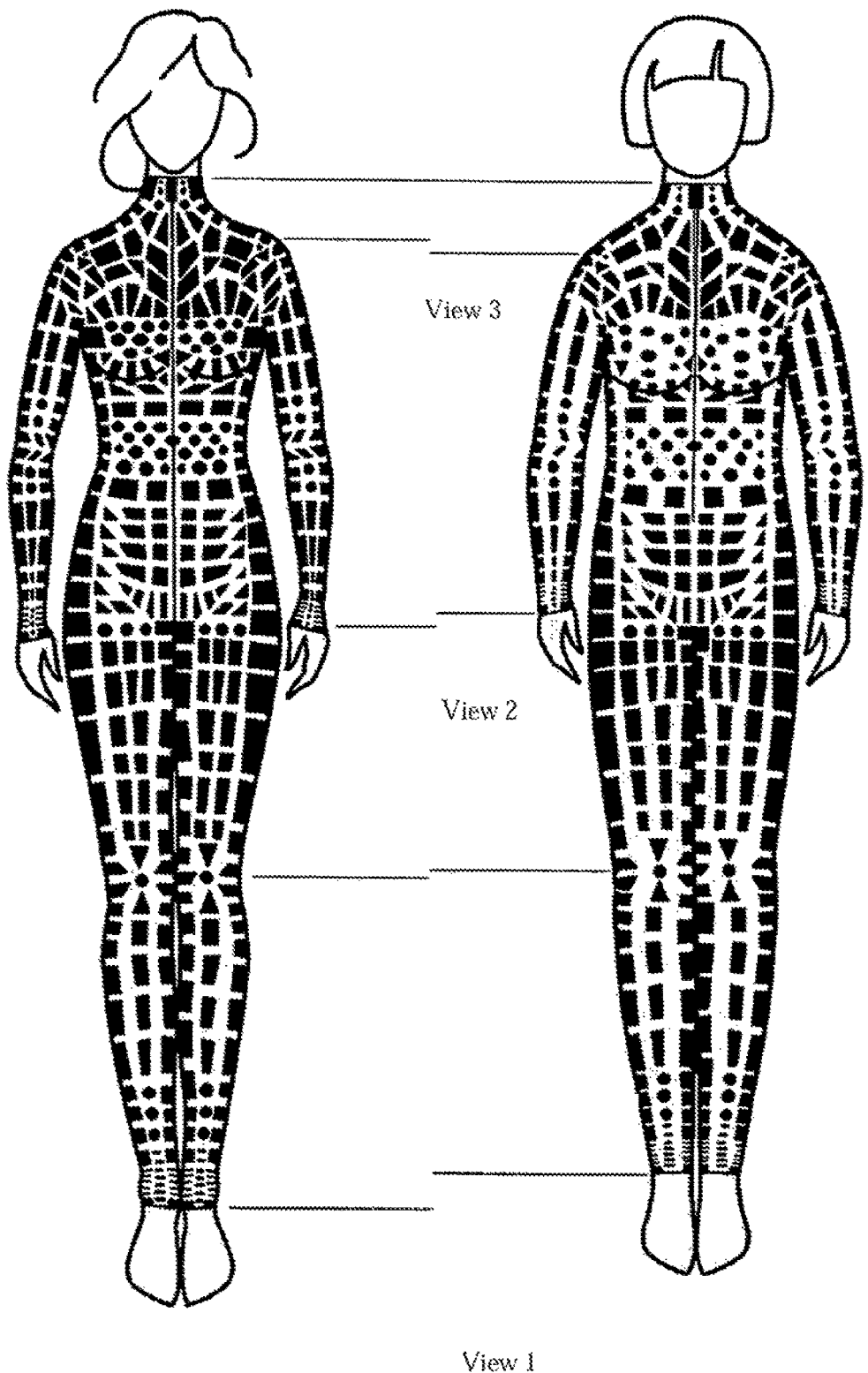
FIG. 4 shows a comparison of two different figures dressed in identical elastic templates. The figure illustrates changes in relative position of reference geometrical elements of the templates when the elastic templates are worn by two people with different size features.

FIG. 4. shows an example of two different human figures in front view, the figures covered in a overall-type template bearing graphical reference elements having a standard pattern and size. Figures clearly show differences in size features. For the purposes of clarity, horizontal lines in FIG. 4 show differences in height (View 1), sleeve length (View 2) and position of shoulder points (View 3). The figure clearly shows differences in waist circumference, hip circumference, chest circumference, shoulder circumference, wrist circumference, etc. The figure demonstrates that any size features of the human body will appear on the photographic image, and therefore, a pattern based on relative positioning of reference elements will be unique for each individual and, in case of sufficient detail visibility, each individual pattern can be converted into a three-dimensional mathematical model.

Figure 5:
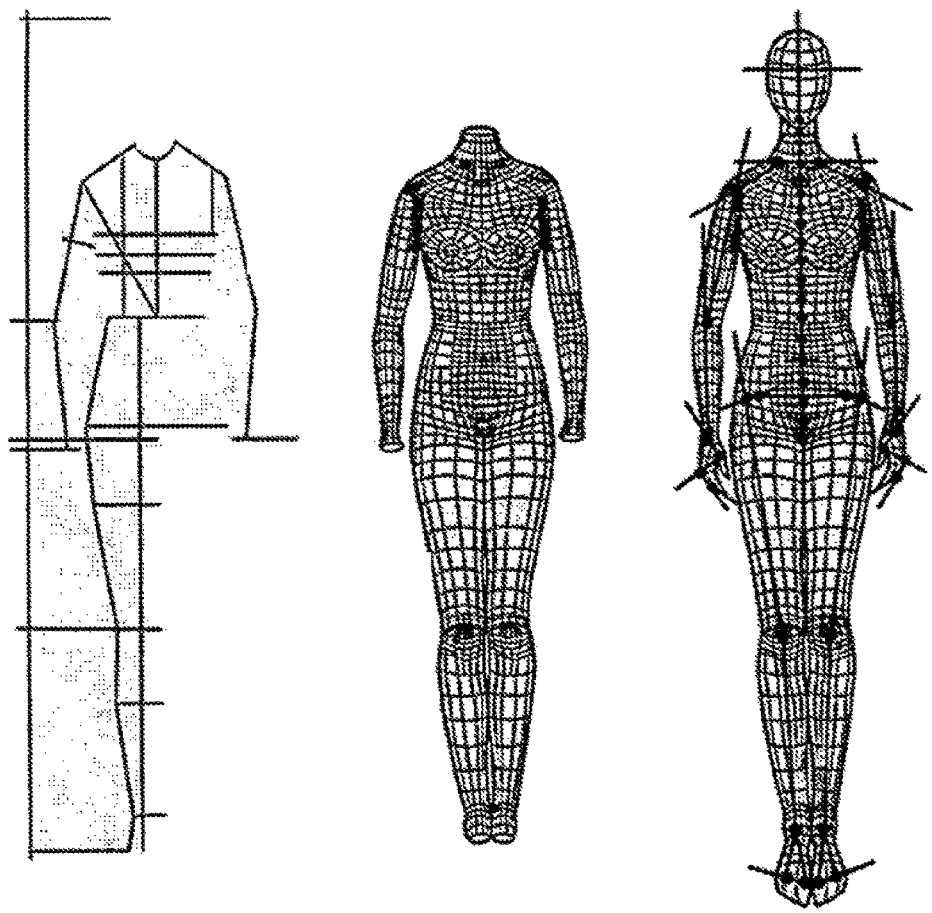
FIG. 5 shows an example of virtual realization of three-dimensional mathematical models.

An example of virtual realization of three-dimensional mathematical models is shown in FIG. 5. Different amounts of calculations and different degrees of calculation detail can provide modeling result of different complexity. For example, the calculation results are divided into three groups. The first group of calculations includes the simplest calculations associated with taking body measurements. The result of said calculations is recorded as a numerical expression and can be supplemented with a textual description (FIG. 5, View 1). It is clear that in recording of measurements, the amount of stored data is minimal, said data is easy to work with, to transfer electronically and to store on electronic storage media, the data can further be readily arranged in a list or a table or printed out. The data for said model is expressed alphanumerically, thus providing ease of file recording, formatting and re-encoding between different systems. Such mathematical model type is convenient and fully adapted for use in systems of automatic clothing programming widely available worldwide.

An example of a different level of a three-dimensional virtual model (FIG. 5, View 2) is a static three-dimensional contour made up of intersecting curved lines, the contour circumscribing body surface shape and size. A digital description of a virtual model of this type is realized by means of files of specific types using functions, equations and spatial coordinates for providing a detailed description. The calculations for such model are more complex compared to the model shown in FIG. 5, View 1, and require computing hardware of greater processing power. The results of such calculation are stored in graphical files of special formats and can only be read using specialized software. Some of the automatic clothing programming systems comprise 3D modules and provide fitting of clothing based on three-dimensional models. In any case, the amount of stored or transferred data in this example is much higher, which can be pose difficulties in transferring and storing said data, as well as in transferring, decompressing or re-formatting of files of such type. However, the three-dimensional model has an important advantage, as it can be used to extract a model with first-level measurements (FIG. 5, View 1) or any individual measurements on demand.

The most complex of the models is shown in FIG. 5, View 3. The model is a view of a virtual model of FIG. 5, View 2, supplemented with algorithms describing motion parameters of the body. The dynamic model is also a spatial contour consisting of curved lines forming a net of varying density circumscribing body surface, the contour supplemented with a support contour describing the skeleton with joints and muscles, as well as individual tendencies and characteristics relating to motion, gait and limits of flexibility of the human prototype. The description of the support contour, the effect of motion on body surface and the description of motion scenarios constitute a large additional chunk of data requiring computing hardware with high processing power. This technology is yet to be used in conventional CAD systems, but such possibilities would be interesting for the consumer. A file containing a dynamic model description is even larger than the static model file. In addition to the measurement extraction ability, such model would provide additional possibilities of dynamic fitting or taking measurements from a body or parts thereof imaged in non-standard positions. For example, such model can be used for fitting form-fitting trousers with the user in a squatting position, or for fitting sleeve length with the user's arm outstretched forward or raised upwards.

Figure 6:
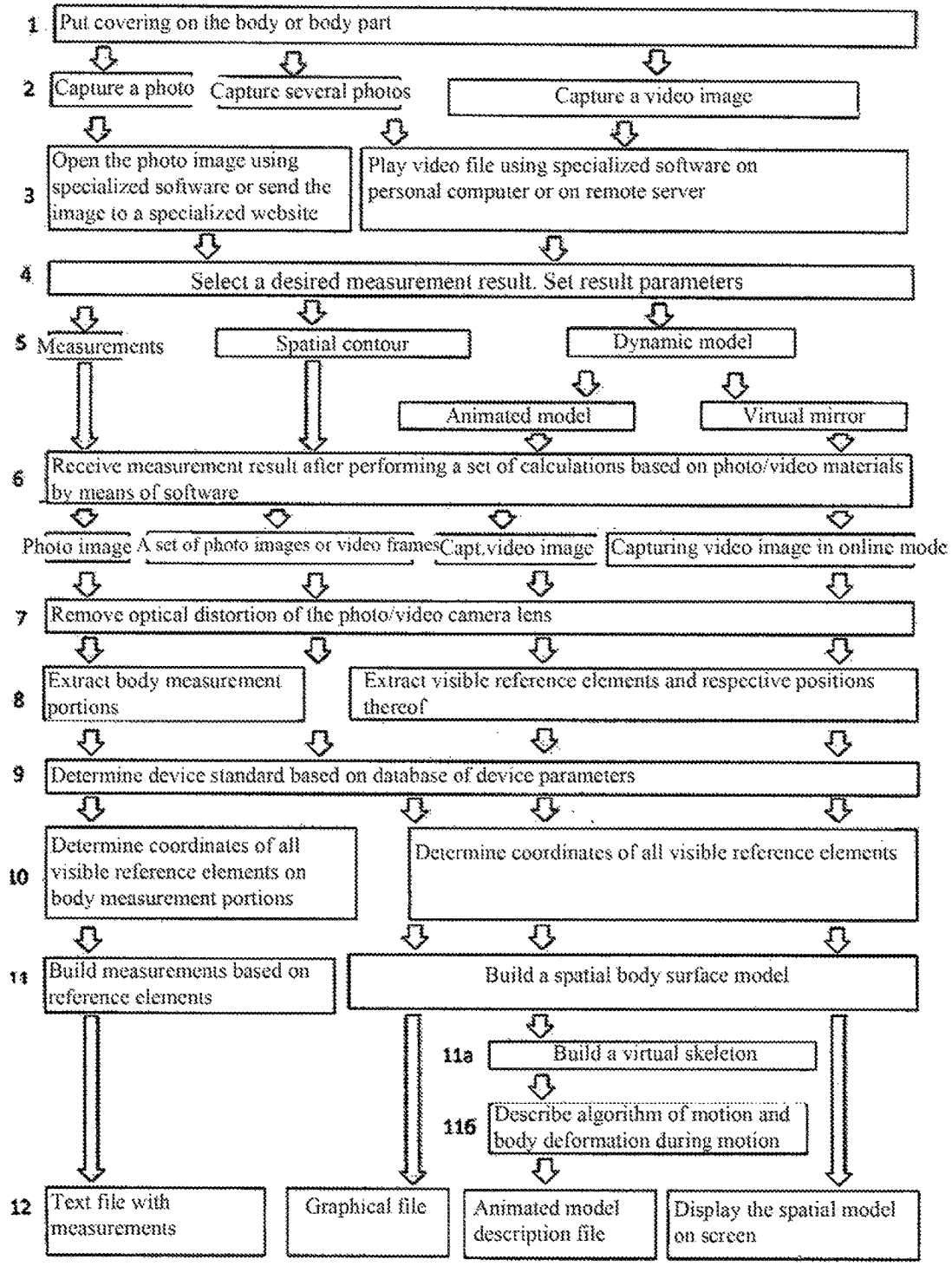
FIG. 6 shows a flow chart illustrating the virtual clothing selection algorithm.

In order to extract required measurements from a visual result, the frame must be processed using specialized software that provides calculations of body measurements and of spatial coordinates of graphical reference elements with required precision. FIG. 6 shows a flow chart of the procedure of taking measurements, the chart describing the operating sequence of the system.

(1) The user puts the covering on his/her body or parts thereof the user wants to be measured. The process is not difficult to carry out at home, and a healthy adult person can do it without help.

(2) Photo or video imaging of the body to be measured is required. Image quality must be sufficient in order to recognize details of the covering and reference elements.

The photographic image must be recorded in a digital format, so that (3) the software could subsequently process the image file.

The user has to specify measurement target (4) and the desired measurement result.

(5) Several variations of virtual models can be selected; each model can include subtypes differing in precision and detail. If the photo/video image quality is insufficient or the material is incomplete, the software performs preliminary processing, and then informs the user that the material is incomplete and recommends supplementing the material with additional photo/video images.

After all calculations carried out by specialized software are complete, the user is provided with the desired result or a number of results (6) recorded in files (12). Software data can be processed on user's personal computer if relevant software is installed.

Alternatively, the user can send primary material to a remote server providing a service, and receive the result without installing software. Prior to calculation, the software corrects optical distortion of the lens (7) occurring in any optical systems, and prepares photographic material for subsequent calculations.

The calculation process further includes steps (8) of extraction of portions relevant for measurement or highlighting all reference elements for creating spatial contours.

Following the principle of extracting conventional tailoring measurements as a basic result from the entire body of data in order to emphasize important measurement areas, a separate amplified extraction of such body portions and related measurement areas can be performed. Such extraction can be achieved using various methods: color-coding, textures, reflective or contrasting elements, or using elements of a specific shape on each individual body portion in order to improve precision of measurements being taken.

Figure 7:
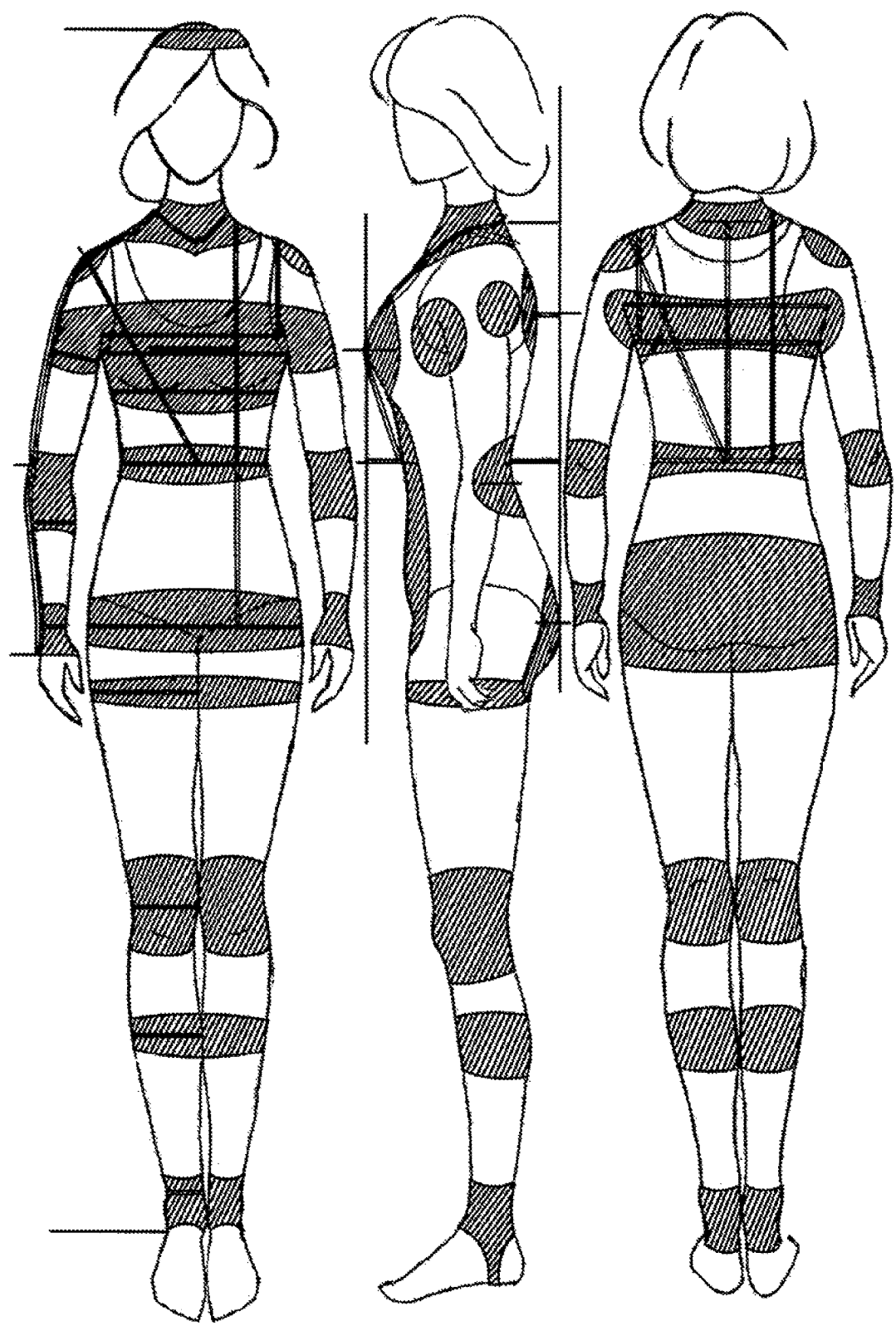
FIG. 7 shows a diagram illustrating highlighting and positioning of measured areas and showing parts of the body relevant for measuring.

It is necessary to take device standard into account during calculation (9). Device standards are required for taking precise measurements. Due to the elasticity of the covering material of the device, the extension coefficient thereof allows the device to be stretched by over 35%; thus, a device having one standard can be used by persons of different height, girth and body sizes. When calculating coordinates and sizes of reference elements (10) in case of measurement calculations, the software uses less processing power and calculates coordinates of reference elements only for body portions relevant for taking measurements. Body portions relevant for taking measurements and determining posture are shown in FIG. 7. The measurement calculation step (11) or spatial contour calculation step is the final step of the calculation process for static models, with a further steps of skeletal, joint and animation calculations (11a, 11b) in case of a dynamic model. In online mode, the software simply tracks motion of the elements and adjusts position thereof, which allows for recalculation of the contour and for reproduction of movement with specified frequency.

Figure 8:
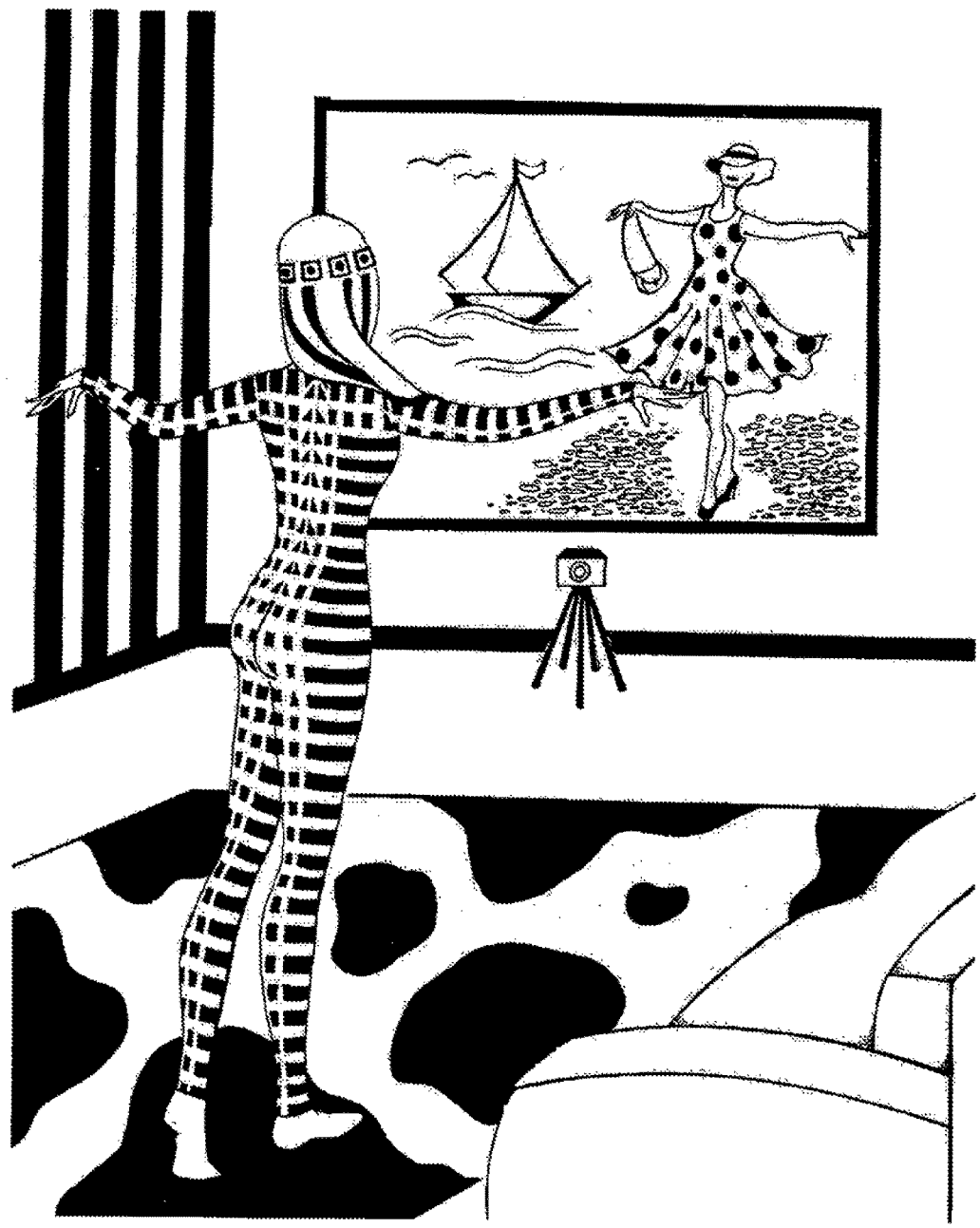
FIG. 8 shows an example of dynamic use of the elastic template. The figure illustrates the possibility of using the system when moving, in order to create a most realistic effect of posing in front of the mirror.

An example of using the method in online mode is shown in FIG. 8. Essentially, the subject sees themselves on the screen as if they were using a mirror. The subject can move arbitrarily, similarly to the process of trying on clothes in front of a mirror, but the process of selecting and changing clothing is significantly faster due to the fact that the software determines and offers only clothing of suitable sizes.

The process of changing clothes does not require any physical activity and can be performed by clicking on a desired clothing design. The subject can select the changing-room background image and can see themselves in any setting, indoors or outdoors, in various simulated conditions of the environment.

Figure 9:
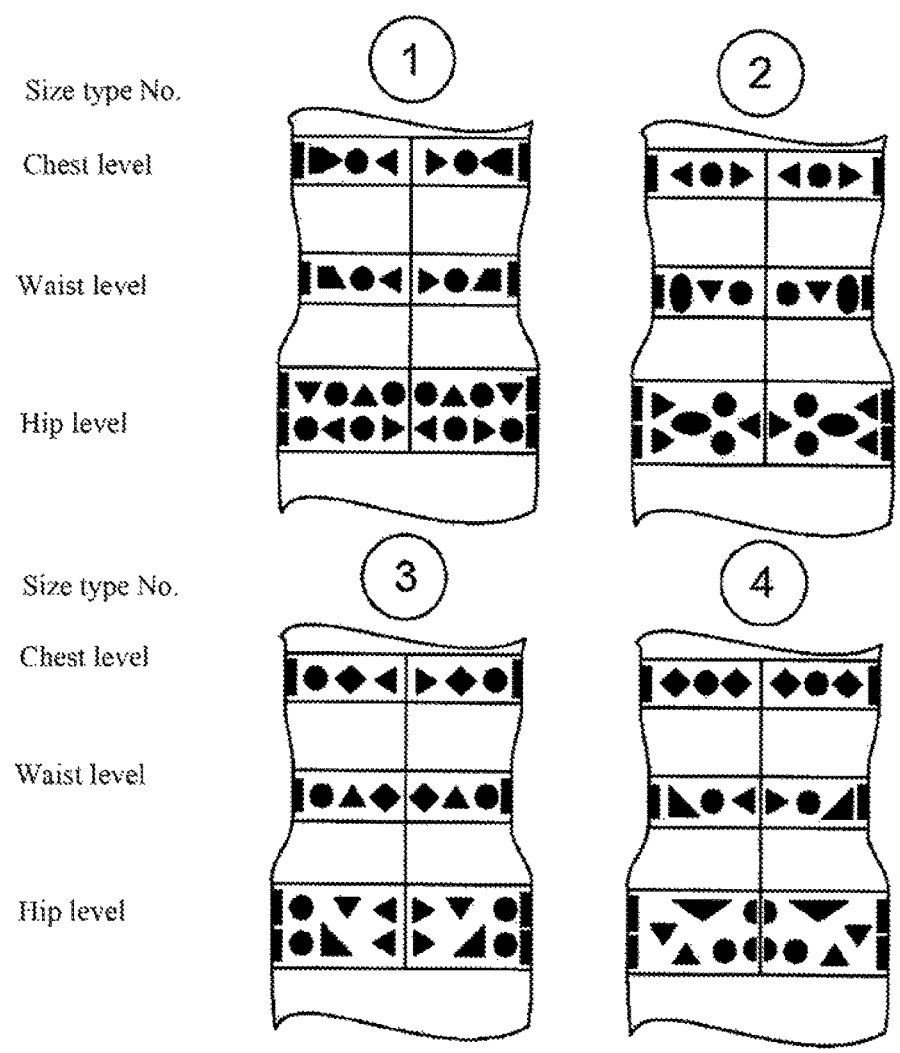
FIG. 9 shows an example of elastic templates bearing reference markings.

An example of elastic templates bearing reference markings is shown in FIG. 9.

Graphical elements on devices with different standards are combined in various combinations, providing visual recognition and individual pattern for elastic templates of each size type. Examples of four elastic templates of differing standards are illustrated in the figure.

An example of elastic template size type selection is shown in the table in FIG. 9.

Elastic template selection is determined using the size type table, with chest, waist and hip circumference and height used as primary selection parameters. For example, women with height ranging from 146 cm to 170 cm and with girth groups 1 to 4 (based on standard figure types) can select one of five elastic template sizes using the elastic template standard selection table. Men with height ranging from 155 cm to 188 cm can select one of four standards based on chest and hip circumference values using the selection table.

If the user does not know his/her body size his/her body can be measured using a measuring tape with tolerable margin of error. Any margin of error is compensated by the elastic template due to extensibility and form-fitting and form-hugging nature of the template following the individual body shape. Having selected an elastic template of suitable size type, the user purchases the elastic template for personal use. A standard elastic template can fit multiple bodies with similar size features and can be used multiple times indefinitely. The elastic template can be used to save time for the buyer selecting and picking clothing at home or in special changing rooms arranged in retail shops. The elastic template can be put on a naked body, over regular underwear or over thin underwear covering the entire body.

That which is claimed:

1. A method for virtually selecting clothing, the method including:
    obtaining images of a subject to be provided with selected clothing and transferring the images to a computing device;
    computing body parameters, while using software for processing the images of the subject for determining the body parameters thereof and converting the images into a form suitable for transferring to at least one website based on at least one web server;
    comparing the body parameters of the subject with size parameters of clothing being sold through databases of various manufacturers, and selecting articles of clothing meeting the subject's requirements; and
    forming a three-dimensional image of a mannequin having the body parameters of the subject and wearing the selected articles of clothing,
    the method being characterized by:
    using at least two of the images of the subject, the images being comprising a front view and a rear view;
    wearing by the subject being photographed an elastic template having reference markings, the elastic template used in calculating the body parameters of the measured subject, wherein the computing device determines the actual sizes of the body parameters by:
    providing the elastic template having an elastic base extensible within one individual size type with non-extensible graphical elements as the reference markings;
    providing the non-extensible graphical elements of different geometric shapes and sizes, affixing the non-extensible graphical elements to an outer surface of the elastic base, the non-extensible graphical elements having dimensional stability and non-extensibility in all directions and providing a size template;
    determining a size type of the elastic template by the type of the reference markings based on the non-extensible graphical elements; and
    comparing dimensions of extensible portions on the images with reference dimensions of the extensible portions, the reference dimensions being the dimensions of the non-extensible graphical elements on the elastic template;
    wherein the images are at least one of photo images and video images;
    wherein shape, number and positioning of the non-extensible graphical elements are selected based on the size type of the elastic template; and
    wherein parts of the non-extensible graphical elements are disposed to be visible on the at least two of the images.

2. The method according to claim 1 comprising:
    using standardized sets of elastic templates having reference markings and different size types comprising at least one of full bodied clothing and individual articles of clothing; and
    using software for processing the images of bodies wearing the elastic templates, the software being stored on at least one of a personal computing device and website.

3. The method according to claim 1 comprising:
    forming, a library of template size types with markings formed by the non-extensible elements while simultaneously using the standardized sets of elastic templates.

4. The method according to claim 3 wherein each subject in the library of three-dimensional subject body models on the website is assigned a unique identification code.

5. The method according to claim 1 comprising: installing on at least one of a single computer and a plurality of computers the software used for computing dimensions of various body areas and building three-dimensional models of the subject's body based on computations.

6. The method according to claim 5 wherein at least one device is used for preparing the images for subsequent processing and another device is used for remaining computations.

7. The method according to claim 1, wherein the website belongs to a clothing seller or the website is created by a clothing seller.

8. The method according to claim 1 comprising:
    recording the body parameters of the measured subject in a library stored on said website; and storing the three-dimensional model of the subject's body on said website in a library accessible by the subject, the seller and the clothing manufacturer, wherein said library data can be subsequently used by the subject by inputting an identification code without further measurement of the body parameters.

9. The method according to claim 1 comprising:

providing the non-extensible graphical elements of different geometric shapes and sizes;

providing the size template disposing the non-extensible graphical elements selectively defining spatial positions between them by forming a unique pattern of individual portions of the body for each template size type.

10. The method of claim 1 comprising the step of utilizing a computing device to execute software code to carry out the method.

11. The method of claim 1 comprising a computer-readable medium comprising instructions which, when executed by a computer, cause the computer to carry out the method.

* * * * *